United States Patent
Ito et al.

(10) Patent No.: US 9,756,587 B2
(45) Date of Patent: Sep. 5, 2017

(54) ESTIMATION APPARATUS, SYSTEM, AND COMPUTER PROGRAM PRODUCT

(71) Applicant: Kabushiki Kaisha Toshiba, Minato-ku (JP)

(72) Inventors: Masashi Ito, Yokohama (JP); Akira Kawarada, Fuchu (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 105 days.

(21) Appl. No.: 14/947,593

(22) Filed: Nov. 20, 2015

(65) Prior Publication Data
US 2016/0360499 A1 Dec. 8, 2016

(30) Foreign Application Priority Data
Jun. 5, 2015 (JP) ................. 2015-115070

(51) Int. Cl.
*H04W 56/00* (2009.01)
*H04L 12/26* (2006.01)
*H04L 7/00* (2006.01)
*H04L 12/24* (2006.01)
*H04W 84/20* (2009.01)

(52) U.S. Cl.
CPC ..... *H04W 56/0015* (2013.01); *H04L 41/0803* (2013.01); *H04W 84/20* (2013.01)

(58) Field of Classification Search
CPC ............. H04W 56/0015; H04W 86/20; H04W 52/242; H04W 52/243; H04W 52/281
USPC ......................................................... 370/252
See application file for complete search history.

(56) References Cited

U.S. PATENT DOCUMENTS

| | | | |
|---|---|---|---|
| 2011/0064079 A1* | 3/2011 | Lim | H04L 12/185 370/390 |
| 2013/0028169 A1* | 1/2013 | Bontu | H04B 7/15542 370/315 |
| 2013/0235729 A1* | 9/2013 | Mutoh | H04L 47/27 370/237 |

(Continued)

FOREIGN PATENT DOCUMENTS

JP 2013-175913 9/2013

*Primary Examiner* — Asad Nawaz
*Assistant Examiner* — Jason Harley
(74) *Attorney, Agent, or Firm* — Oblon, McClelland, Maier & Neustadt, L.L.P.

(57) ABSTRACT

According to an embodiment, an estimation apparatus includes first to fourth obtainers and an estimator. The first obtainer obtains, for each slave node, a piece of synchronization information in a network configuration including: nodes including a master node serving as a time synchronization source, one or more slave nodes serving as time synchronization destinations, and relay nodes; and paths connecting the nodes. The second obtainer obtains, for each path, a piece of band information. The third obtainer obtains, for each path, a piece of traffic information. The fourth obtainer obtains, for each relay node, a piece of path information. The estimator estimates a predetermined relay node causing reduction of accuracy of time synchronization between the master node and the one or more slave nodes, based on the one or more pieces of synchronization information, the pieces of band information, the pieces of traffic information, and the pieces of path information.

14 Claims, 9 Drawing Sheets

(56) References Cited

U.S. PATENT DOCUMENTS

2015/0222410 A1\* 8/2015 Belghoul ............ H04W 28/085
370/252

\* cited by examiner

ESTIMATION APPARATUS, SYSTEM, AND COMPUTER PROGRAM PRODUCT

CROSS-REFERENCE TO RELATED APPLICATIONS

This application is based upon and claims the benefit of priority from Japanese Patent Application No. 2015-115070, filed on Jun. 5, 2015; the entire contents of which are incorporated herein by reference.

FIELD

Embodiments described herein relate generally to an estimation apparatus, system, and computer program product.

BACKGROUND

Conventionally, there is known a technique in which in a network configuration including a plurality of nodes and a plurality of paths that connect the nodes, costs of a respective plurality of routes are calculated based on information indicating the quality of each node, and a communication route is determined based on the calculated costs.

However, conventional techniques such as that described above merely determine an optimal communication route in a network configuration in the present state. Thus, when time synchronization is achieved between a master node and one or more slave nodes through relay nodes in a network configuration such as that described above, a relay node that causes the reduction of the accuracy of time synchronization cannot be estimated.

DETAILED DESCRIPTION

According to an embodiment, an estimation apparatus includes a first obtainer, a second obtainer, a third obtainer, a fourth obtainer, and an estimator. The first obtainer obtains, for each of one or more slave nodes, a piece of synchronization information about a synchronization message for time synchronization to be communicated with a master node through at least one of a plurality of relay nodes in a network configuration including a plurality of nodes and a plurality of paths connecting the nodes. The plurality of nodes includes the master node serving as a time synchronization source, the one or more slave nodes serving as time synchronization destinations, and the plurality of relay nodes. The second obtainer obtains, for each of the paths, a piece of band information about a bandwidth of the path. The third obtainer obtains, for each of the paths, a piece of traffic information about an amount of traffic in the path. The fourth obtainer obtains, for each of the relay nodes, a piece of path information about one or more paths on the relay node. The estimator estimates a predetermined relay node that causes reduction of accuracy of time synchronization between the master node and the one or more slave nodes from among the plurality of relay nodes, based on the one or more pieces of synchronization information, the plurality of pieces of band information, the plurality of pieces of traffic information, and the plurality of pieces of path information.

Embodiments will be described in detail below with reference to the accompanying drawings.

First Embodiment

Figure 1:
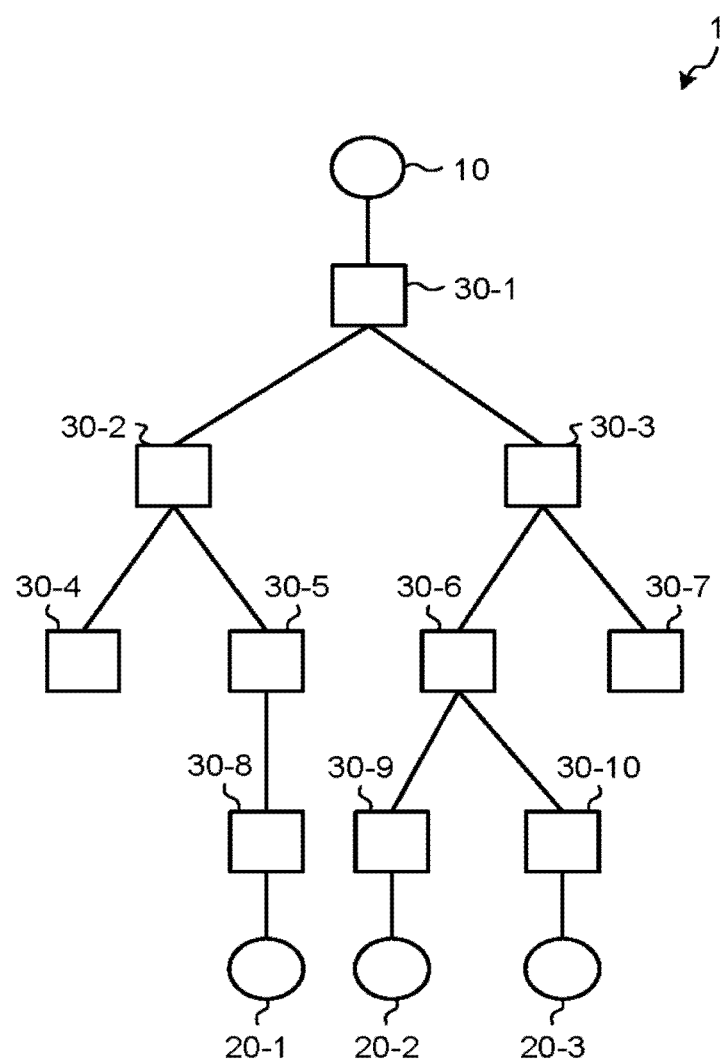
FIG. 1 is a diagram illustrating an example of a network configuration of a first embodiment.

FIG. 1 is a diagram illustrating an example of a network configuration 1 of a first embodiment. As illustrated in FIG. 1, the network configuration 1 includes a plurality of nodes including a master apparatus 10 serving as a time synchronization source (an example of a master node), slave apparatuses 20-1 to 20-3 serving as time synchronization destinations (an example of one or more slave nodes), and network apparatuses 30-1 to 30-10 (an example of a plurality of relay nodes); and a plurality of paths that connect the nodes.

In the following description, when the slave apparatuses 20-1 to 20-3 do not need to be distinguished from each other, they may be simply referred to as slave apparatuses 20, and when the network apparatuses 30-1 to 30-10 do not need to be distinguished from each other, they may be simply referred to as network apparatuses 30. In addition, although the example illustrated in FIG. 1 exemplifies the case of one master apparatus 10, three slave apparatuses 20, and ten network apparatuses 30, the numbers of the apparatuses are not limited thereto. In addition, the network configuration 1 may include apparatuses other than the master apparatus 10, the slave apparatuses 20, and the network apparatuses 30.

The master apparatus 10 is a computer such as a server apparatus that clocks a reference time for time synchronization. Each of the slave apparatuses 20 obtains a reference time clocked by the master apparatus 10, by communicating (transmitting and receiving) synchronization messages for time synchronization with the master apparatus 10 through at least one of the network apparatuses 30-1 to 30-10, and synchronizes its time using the obtained reference time. Examples of the slave apparatuses 20 include industrial devices, but the slave apparatuses 20 are not limited thereto. The network apparatuses 30 are to relay communication. Examples of the network apparatuses 30 include switching apparatuses, but the network apparatuses 30 are not limited thereto.

Figure 2:
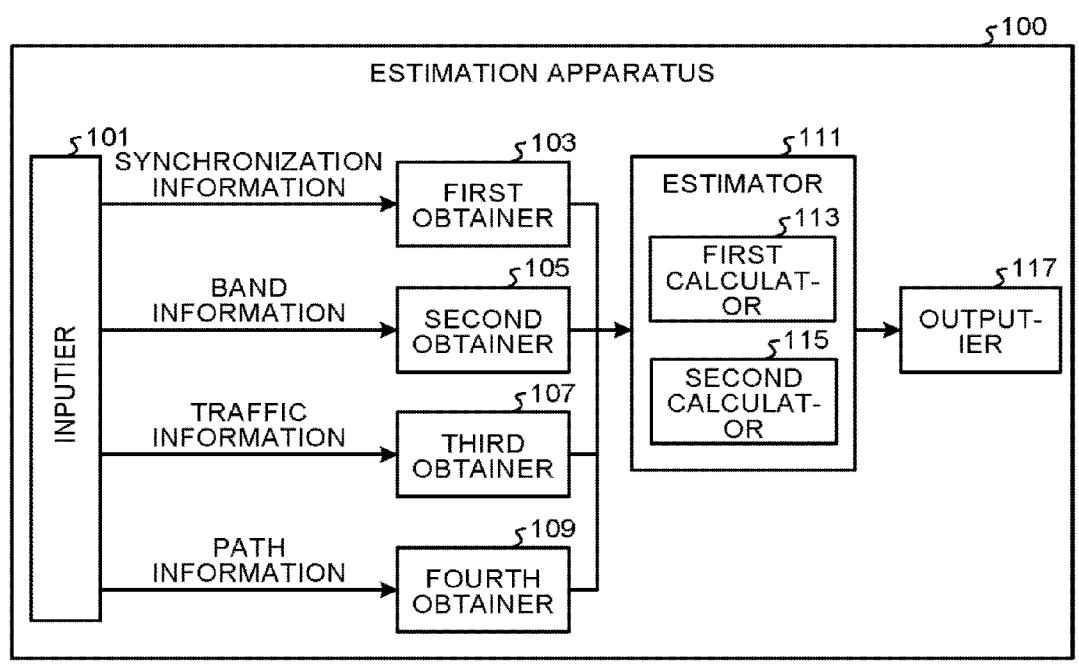
FIG. 2 is a diagram illustrating an example of a configuration of an estimation apparatus of the first embodiment.

FIG. 2 is a diagram illustrating an example of a configuration of an estimation apparatus 100 of the first embodiment. As illustrated in FIG. 2, the estimation apparatus 100 includes an inputter 101, a first obtainer 103, a second obtainer 105, a third obtainer 107, a fourth obtainer 109, an estimator 111, and an outputter 117. The estimator 111 includes a first calculator 113 and a second calculator 115.

The inputter 101 can be implemented by, for example, input apparatuses such as a mouse, a keyboard, and a touch panel. Note that the inputter 101 may be included in or externally attached to the estimation apparatus 100. The first obtainer 103, the second obtainer 105, the third obtainer 107, the fourth obtainer 109, the estimator 111, and the outputter 117 may be implemented, for example, by causing a processing apparatus such as a CPU (Central Processing Unit) to execute a program, i.e., by software, or may be implemented by hardware such as an IC (Integrated Circuit), or may be implemented by a combination of software and hardware.

In the first embodiment, the estimation apparatus 100 is not connected to the network configuration 1, and estimates a network apparatus 30 that causes reduction of the accuracy of time synchronization, using various types of information about the network configuration 1 which are inputted by a network administrator using the inputter 101.

Based on network administrator's operations, the inputter 101 accepts, as input, pieces of synchronization information of the respective slave apparatuses 20-1 to 20-3, pieces of band information of the respective plurality of paths, pieces of traffic information of the respective plurality of paths, and pieces of path information of the respective network apparatuses 30-1 to 30-10.

The synchronization information is information about synchronization messages communicated by a slave apparatus 20. In the first embodiment, the synchronization information includes a message ID that identifies a synchronization message (an example of message identification information); path IDs that identify respective one or more paths forming a route for the synchronization message (an example of path identification information); and cycle information that indicates the transmission cycle of the synchronization message. The path IDs identify input and output paths of a plurality of inputs and a plurality of outputs of the network apparatuses.

Note that the network administrator can identify a route for a synchronization message from the design information of the network configuration 1 and the design information of a communication sequence between the slave apparatus 20 and the master apparatus 10, and can identify the transmission cycle of the synchronization message from the set value of the slave apparatus 20 (specifically, the set value of a time synchronization application installed on the slave apparatus 20).

The band information is information about a bandwidth of a path. In the first embodiment, the band information includes a path ID that identifies a path; and bandwidth information that indicates a bandwidth of the path. Note that the network administrator can identify bandwidth information from the design information of the network configuration 1.

The traffic information is information about the amount of traffic in a path. In the first embodiment, the traffic information includes a path ID that identifies a path; and amount-of-traffic information indicating the amount of traffic in the path. Note that the network administrator can identify traffic information from the design information of the network configuration 1, the design information of a communication sequence between terminals that perform communication through the network apparatuses 30, such as the master apparatus 10 and the slave apparatuses 20 (the terminals may include terminals other than the master apparatus 10 and the slave apparatuses 20, which are not illustrated in FIG. 1), and the bit rate of communication by the communication sequence.

The path information is information about one or more paths on a network apparatus 30. In the first embodiment, the path information includes a network apparatus ID that identifies a network apparatus 30 (an example of relay node identification information); and path IDs of respective one or more paths on the network apparatus 30. Note that the network administrator can identify path information from the design information of the network configuration 1.

The first obtainer 103 obtains the pieces of synchronization information of the respective slave apparatuses 20-1 to 20-3 from the inputter 101. The second obtainer 105 obtains the pieces of band information of the respective plurality of paths from the inputter 101. The third obtainer 107 obtains the pieces of traffic information of the respective plurality of paths from the inputter 101. The fourth obtainer 109 obtains the pieces of path information of the respective network apparatuses 30-1 to 30-10 from the inputter 101.

The estimator 111 estimates a predetermined network apparatus (an example of a predetermined relay node) that causes reduction of the accuracy of time synchronization performed between the master apparatus 10 and the slave apparatuses 20-1 to 20-3 from among the network apparatuses 30-1 to 30-10, based on the pieces of synchronization information of the respective slave apparatuses 20-1 to 20-3 obtained by the first obtainer 103, the pieces of band information of the respective plurality of paths obtained by the second obtainer 105, the pieces of traffic information of the respective plurality of paths obtained by the third obtainer 107, and the pieces of path information of the respective network apparatuses 30-1 to 30-10 obtained by the fourth obtainer 109.

Specifically, the estimator 111 calculates, for each network apparatus 30, a first synchronization hindrance level which is a synchronization hindrance level of the network apparatus 30 against the slave apparatuses 20-1 to 20-3, based on the pieces of synchronization information of the respective slave apparatuses 20-1 to 20-3 obtained by the first obtainer 103, the pieces of band information of the respective plurality of paths obtained by the second obtainer 105, the pieces of traffic information of the respective plurality of paths obtained by the third obtainer 107, and the pieces of path information of the respective network apparatuses 30-1 to 30-10 obtained by the fourth obtainer 109.

The first synchronization hindrance level indicates the level of influence exerted by the network apparatus 30 on fluctuations in communication delay in communication of synchronization messages performed by the slave apparatuses 20-1 to 20-3 with the master apparatus 10. In the first embodiment, the larger the value of the first synchronization hindrance level, the larger the fluctuations in communication delay, causing reduction of the accuracy of time synchronization.

Then, the estimator 111 estimates a predetermined network apparatus, based on the first synchronization hindrance levels of the respective network apparatuses 30-1 to 30-10.

Given below is the explanation of a specific example of estimation of a predetermined network apparatus using the first calculator 113 and the second calculator 115 which are included in the estimator 111.

The first calculator 113 calculates a band usage rate for each path, based on the pieces of band information of the respective plurality of paths obtained by the second obtainer 105 and the pieces of traffic information of the respective plurality of paths obtained by the third obtainer 107. For example, the first calculator 113 calculates a band usage rate for each path using equation (1).

$$\text{Band usage rate}_i = \text{the amount of traffic in a path}_i \text{ (bps)/the bandwidth of the path}_i \text{ (bps)} \quad (1)$$

Here, i indicates a path ID.

The second calculator 115 calculates, for each set of a path and a slave apparatus 20, a second synchronization hindrance level which is a synchronization hindrance level of the path against the slave apparatus 20, based on the band usage rate for each path which is calculated by the first calculator 113 and the pieces of synchronization information of the respective slave apparatuses 20-1 to 20-3 obtained by the first obtainer 103.

Note that the second synchronization hindrance level is a band usage rate of the path used by synchronization messages of the slave apparatus 20, and indicates the level of influence exerted by the path on fluctuations in communication delay in communication of synchronization messages performed by the slave apparatus 20 with the master apparatus 10.

For example, the second calculator 115 calculates a second synchronization hindrance level using equation (2).

$$\text{Second synchronization hindrance level}_{i,j} = \text{band usage rate}_i \times \text{the number of synchronization messages}_j \text{ on a path}_i / \text{the transmission cycle}_j \text{ of the synchronization messages} \quad (2)$$

Here, j indicates the ID of a slave apparatus 20. The number of synchronization messages$_j$ on a path$_i$ is the number of path IDs indicating paths$_i$ included in the synchronization information of the slave apparatus $20_j$.

Then, the second calculator 115 adds up, for each slave apparatus 20, the second synchronization hindrance levels of the respective plurality of paths to calculate a third synchronization hindrance level. Note that the third synchronization hindrance level indicates the level of influence exerted by all of the plurality of paths on fluctuations in communication delay in communication of synchronization messages performed by the slave apparatus 20 with the master apparatus 10. For example, the second calculator 115 calculates a third synchronization hindrance level using equation (3).

$$\text{Third synchronization hindrance level}_j = \sum_{i=1}^{N} \text{Second synchronization hindrance level}_{i,j} \quad (3)$$

Here, N indicates the total number of paths.

Then, the second calculator 115 calculates, for each path, a fourth synchronization hindrance level which is obtained by subtracting the maximum difference value among difference values between the third synchronization hindrance levels and the second synchronization hindrance levels of the path for each slave apparatus 20, from a third synchronization hindrance level with the maximum value among the third synchronization hindrance levels of the slave apparatuses 20-1 to 20-3.

Note that the fourth synchronization hindrance level is a synchronization hindrance level of the path against the slave apparatuses 20-1 to 20-3, and indicates the level of influence exerted by the path on fluctuations in communication delay in communication of synchronization messages performed by the slave apparatuses 20-1 to 20-3 with the master apparatus 10.

For example, the second calculator 115 calculates a fourth synchronization hindrance level using equation (4).

$$\text{Fourth synchronization hindrance level}_i = \quad (4)$$

$$\max_{j \in \text{syncronization } Gr}(\text{Third synchronization hindrance level}_j) -$$

-continued $$\max_{j \in \text{syncronization } Gr}(\text{Third synchronization hindrance level}_j - \text{Second synchronization hindrance level}_{i,j})$$

Here, the synchronization Gr is a group of slave apparatuses 20 that achieve time synchronization with the master apparatus 10. In the first embodiment, the synchronization Gr indicates the slave apparatuses 20-1 to 20-3. Note, however, that, for example, when those slave apparatuses 20 achieving time synchronization with the master apparatus 10 are the slave apparatuses 20-1 and 20-2, the synchronization Gr indicates the slave apparatuses 20-1 and 20-2. Note that the maximum difference value among difference values between the third synchronization hindrance levels$_j$ and the second synchronization hindrance levels$_{i,j}$ for each of the slave apparatuses 20-1 to 20-3 is the maximum value of the third synchronization hindrance levels$_i$ of each of the slave apparatuses 20-1 to 20-3 where the path$_i$ is eliminated. A value obtained by subtracting this maximum value from a third synchronization hindrance level$_j$ with the maximum value among the third synchronization hindrance levels$_j$ of the respective slave apparatuses 20-1 to 20-3 is the fourth synchronization hindrance level of the path$_i$ against the slave apparatuses 20-1 to 20-3.

Then, the second calculator 115 adds up, for each network apparatus 30, the fourth synchronization hindrance levels of respective one or more paths on the network apparatus 30, based on the pieces of path information of the respective network apparatuses 30-1 to 30-10 obtained by the fourth obtainer 109, to calculate a first synchronization hindrance level. For example, the second calculator 115 calculates a first synchronization hindrance level using equation (5).

$$\text{First synchronization hindrance level} = \sum_{i \in \text{network apparatus}_n} \text{Fourth synchronization hindrance level}_i \quad (5)$$

Here, n indicates the network apparatus ID of a network apparatus 30, and i indicates the path IDs of respective one or more paths on the network apparatus $30_n$.

Then, the estimator 111, as described above, estimates a predetermined network apparatus based on the first synchronization hindrance levels of the respective network apparatuses 30-1 to 30-10.

For example, the estimator 111 classifies, for each network apparatus 30, the network apparatus 30 into a level determined according to the value of the first synchronization hindrance level of the network apparatus 30 among a plurality of levels, and estimates one or more network apparatuses 30 classified into a predetermined level, as a predetermined network apparatus. The predetermined level is, for example, a level into which are classified one or more network apparatuses 30 whose values of first synchronization hindrance levels are larger than those of one or more network apparatuses 30 classified into other levels among the plurality of levels.

For example, it is assumed that the plurality of levels are level 1 to level 3, and the estimator 111 classifies a network apparatus 30 whose first synchronization hindrance level is greater than or equal to a first threshold value into level 1, classifies a network apparatus 30 whose first synchronization hindrance level is less than the first threshold value and greater than or equal to a second threshold value (first threshold value>second threshold value) into level 2, and classifies a network apparatus 30 whose first synchronization hindrance level is less than the second threshold value into level 3. In this case, the estimator 111 estimates one or more network apparatuses 30 classified into level 1, as a predetermined network apparatus.

In addition, for example, the estimator 111 may determine, for each network apparatus 30, whether the first synchronization hindrance level is greater than or equal to a threshold value. If the first synchronization hindrance level is greater than or equal to the threshold value, the estimator 111 may estimate the network apparatus 30 as a predetermined network apparatus.

In addition, for example, the estimator 111 may rank the network apparatuses 30-1 to 30-10 based on the first synchronization hindrance levels of the respective network apparatuses 30-1 to 30-10, and estimate a predetermined network apparatus based on the ranking. In this case, the estimator 111 estimates, for example, the top m ranked network apparatuses 30 (m is a natural number), as predetermined network apparatuses.

The outputter 117 outputs results of the estimation made by the estimator 111. In the first embodiment, the outputter 117 display-outputs the results of estimation made by the estimator 111 to a display, etc. (not illustrated) such that the results of estimation are reflected on a network configuration diagram illustrating the network configuration 1, but the configuration is not limited thereto.

Figure 3:
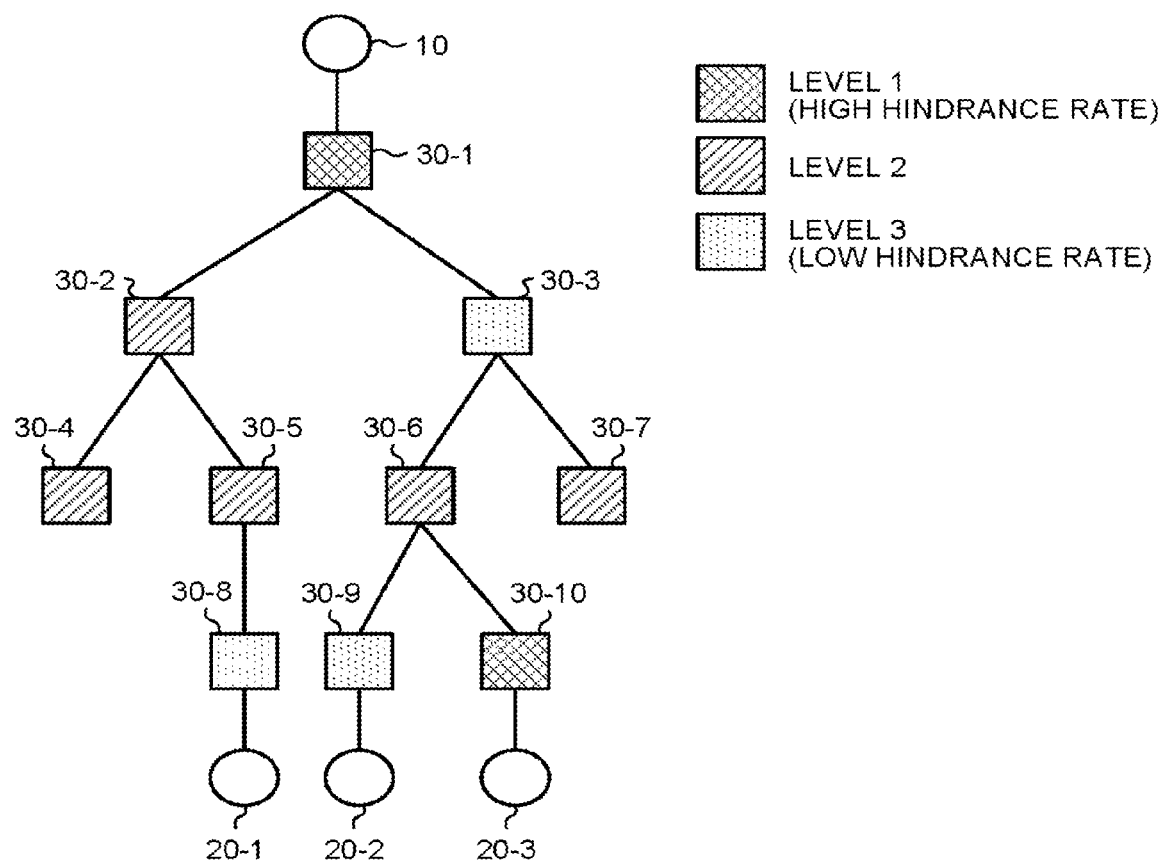
FIG. 3 is a diagram illustrating an example of an output screen of the first embodiment.
Figure 4:
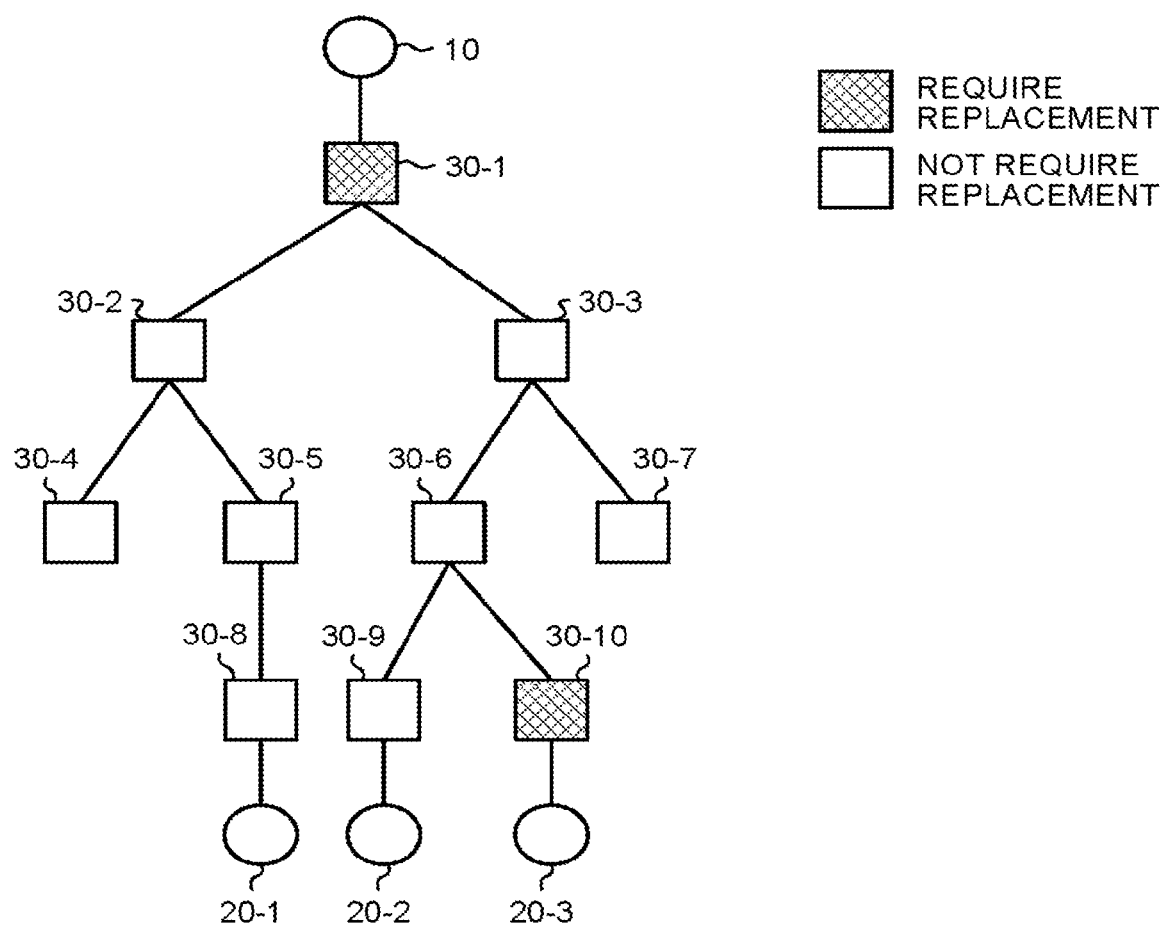
FIG. 4 is a diagram illustrating an example of an output screen of the first embodiment.

FIGS. 3 and 4 are diagrams illustrating examples of an output screen of the first embodiment. FIG. 3 illustrates an example of an output screen for when the estimator 111 estimates predetermined network apparatuses by classifying the network apparatuses 30 into levels determined according to the value of the first synchronization hindrance level, and FIG. 4 illustrates an example of an output screen for when the estimator 111 estimates network apparatuses 30 as predetermined network apparatuses by determining whether the first synchronization hindrance level is greater than a threshold value. In both of the examples of an output screen of FIGS. 3 and 4, the results of estimation made by the estimator 111 are reflected on a network configuration diagram illustrating the network configuration 1.

In the example illustrated in FIG. 3, the network apparatuses 30-1 and the 30-10 are classified into level 1 where a hindrance rate (first synchronization hindrance level) is high, the network apparatuses 30-2 and 30-4 to 30-7 are classified into level 2 where the hindrance rate is intermediate, and the network apparatuses 30-3, 30-8, and 30-9 are classified into level 3 where the hindrance rate is low. Thus, the network apparatuses 30-1 and 30-10 classified into level 1 are estimated as predetermined network apparatuses.

In the example illustrated in FIG. 4, the network apparatuses 30-1 and 30-10 have first synchronization hindrance levels greater than or equal to the threshold value, and thus are estimated as predetermined network apparatuses and are accordingly urged to be replaced, and the network apparatuses 30-2 to 30-9 have first synchronization hindrance levels less than the threshold value, and thus are not estimated as predetermined network apparatuses and are accordingly not urged to be replaced. The predetermined network apparatuses have high first synchronization hindrance levels and thus cause increase of fluctuations in communication delay in communication of synchronization messages performed by the slave apparatuses 20-1 to 20-3 with the master apparatus 10. Accordingly, in the example illustrated in FIG. 4, replacement of a network apparatus with a special network apparatus capable of notifying about the amount of fluctuations in communication delay caused by the network apparatus is urged.

Note that when the estimator 111 estimates the predetermined network apparatuses by ranking the network apparatuses 30-1 to 30-10 based on the first synchronization hindrance level, the outputter 117 may sort a list of the network apparatuses 30-1 to 30-10 according to the ranking, and output the predetermined network apparatuses in an identifiable manner.

Figure 5:
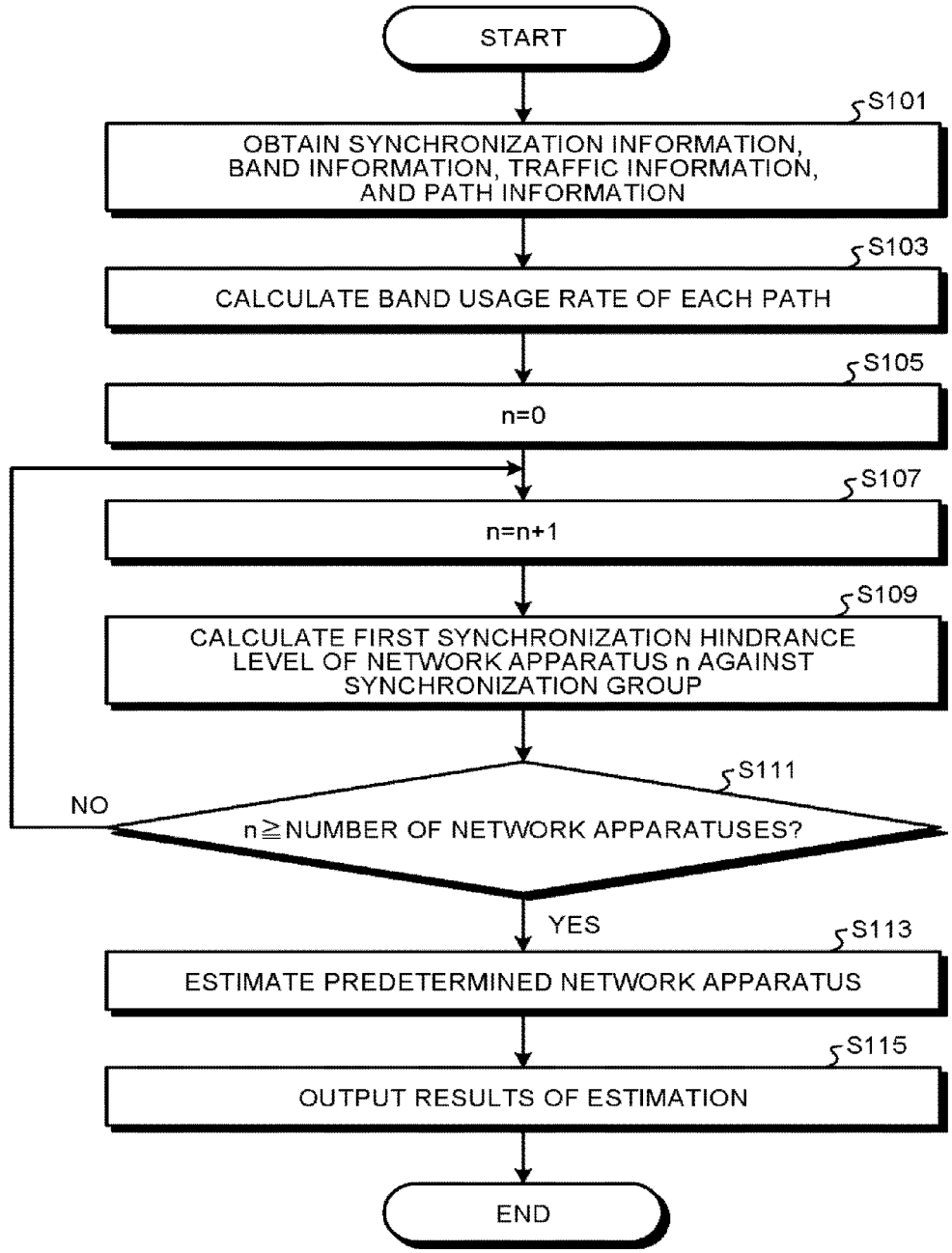
FIG. 5 is a flowchart illustrating an example of a process of the first embodiment.

FIG. 5 is a flowchart illustrating an example of the flow of a procedure for a process performed by the estimation apparatus 100 of the first embodiment. Note that in the example illustrated in FIG. 5 the network IDs of the network apparatuses 30-1 to 30-10 are represented by 1 to 10, respectively, but are not limited thereto.

First, the first obtainer 103 obtains pieces of synchronization information of the respective slave apparatuses 20-1 to 20-3 from the inputter 101, the second obtainer 105 obtains pieces of band information of the respective plurality of paths from the inputter 101, the third obtainer 107 obtains pieces of traffic information of the respective plurality of paths from the inputter 101, and the fourth obtainer 109 obtains pieces of path information of the respective network apparatuses 30-1 to 30-10 from the inputter 101 (step S101).

Subsequently, the first calculator 113 calculates a band usage rate for each path, based on the pieces of band information of the respective plurality of paths obtained by the second obtainer 105 and the pieces of traffic information of the respective plurality of paths obtained by the third obtainer 107 (step S103).

Subsequently, the second calculator 115 initializes a variable n that indicates a network ID to 0 (step S105) and adds 1 to the variable n (step S107).

Subsequently, the second calculator 115 calculates a first synchronization hindrance level of a network apparatus 30, whose network ID is n, against a synchronization group indicating the slave apparatuses 20-1 to 20-3, based on the band usage rate for each path calculated by the first calculator 113, the pieces of synchronization information of the respective slave apparatuses 20-1 to 20-3 obtained by the first obtainer 103, and the pieces of path information of the respective network apparatuses 30-1 to 30-10 obtained by the fourth obtainer 109 (step S109).

Then, the second calculator 115 repeats the processes at steps S107 to S109 until the value of the variable n becomes greater than or equal to the total number of the network apparatuses 30 (No at step S111).

Subsequently, when the value of the variable n becomes greater than or equal to the total number of the network apparatuses 30 (Yes at step S111), the estimator 111 estimates a predetermined network apparatus from among the network apparatuses 30-1 to 30-10, based on the first synchronization hindrance levels of the respective network apparatuses 30-1 to 30-10 (step S113).

Subsequently, the outputter 117 outputs results of the estimation made by the estimator 111 (step S115).

As described above, according to the first embodiment, when one or more slave apparatuses 20 achieve time synchronization by communicating synchronization messages for time synchronization with the master apparatus 10 through at least one of the plurality of network apparatuses 30, a network apparatus 30 that causes reduction of the accuracy of time synchronization due to an increase in fluctuations in communication delay can be estimated from among the plurality of network apparatuses 30.

As such, according to the first embodiment, since a network apparatus 30 that causes reduction of the accuracy of time synchronization can be estimated, the estimated network apparatus 30 can also be replaced with a special network apparatus capable of notifying about the amount of fluctuations in communication delay caused by the network apparatus.

As such, by using, as a network apparatus 30 at a location where the amount of fluctuations in communication delay is large, a special network apparatus capable of notifying about the amount of fluctuations in communication delay caused by the network apparatus, the slave apparatuses 20 can grasp the amount of fluctuations in communication delay occurring at the special network apparatus, when communicating synchronization messages for time synchronization with the master apparatus 10, enabling to grasp the amount of fluctuations occupying a large proportion of the whole amount of fluctuations in communication delay. Hence, the slave apparatuses 20 can achieve time synchronization with the master apparatus 10, excluding the influence of the grasped amount of fluctuations, enabling to increase the accuracy of time synchronization.

The reason that the slave apparatuses 20 can increase the accuracy of time synchronization upon achieving time synchronization with the master apparatus 10, by using, as a network apparatus 30 at a location where the amount of fluctuations in communication delay is large, a special network apparatus capable of notifying about the amount of fluctuations in communication delay caused by the network apparatus will be described in detail below.

First, a slave apparatus 20 transmits a synchronization message requesting for a reference time for time synchronization, to the master apparatus 10, and receives a synchronization message including a time stamp of a reference time for time synchronization from the master apparatus 10. Then, the slave apparatus 20 estimates a current reference time which is the reference time of the master apparatus 10 at the present time, from the time stamp of a reference time for time synchronization and communication delay time which is the time required to receive the synchronization message including a time stamp of a reference time for time synchronization, and synchronizes its time to the estimated current reference time.

That is, the current reference time of the master apparatus 10 is expressed by equation (6).

$$\text{Current reference time} = \text{the time stamp of a reference time} + \text{communication delay time} \qquad (6)$$

Here, the communication delay time is actually the incoming time of a synchronization message, i.e., the time taken from when the master apparatus 10 transmits a synchronization message including a time stamp of a reference time for time synchronization until the slave apparatus 20 receives the synchronization message. However, at this point in time, the slave apparatus 20 does not know the error between a time measured thereby and a reference time measured by the master apparatus 10 and thus cannot directly measure communication delay time.

Hence, the communication delay time is estimated to be time that is one half of the outgoing and incoming time of synchronization messages, as shown in equation (7). Note that the outgoing and incoming time of synchronization messages is the time taken from when the slave apparatus 20 transmits a synchronization message requesting for a reference time for time synchronization until receiving a synchronization message including a time stamp of a reference time for time synchronization, and thus can be directly measured on the slave apparatus 20's side.

$$\text{Communication delay time} = \text{the outgoing and incoming time of synchronization messages}/2 \qquad (7)$$

Note, however, that when communication delay time is estimated in this manner, unless the outgoing time of a synchronization message matches the incoming time of a synchronization message, communication delay time cannot be estimated properly. Note that the outgoing time of a synchronization message is the time taken from when the slave apparatus 20 transmits a synchronization message requesting for a reference time for time synchronization until the master apparatus 10 receives the synchronization message.

However, at a network apparatus 30 that relays synchronization messages, fluctuations occur in the time for queuing a synchronization message, due to overlapping between various frames and transfer timings. Accordingly, an event where the outgoing time of a synchronization message does not match the incoming time of a synchronization message can often occur.

Hence, when the outgoing time of a synchronization message does not match the incoming time of a synchronization message, the communication delay time expressed by equation (7) includes a delay difference which serves as the amount of fluctuations in communication delay. Here, since the delay difference is expressed by equation (8), equation (7) can be transformed into equation (9) using equation (8).

$$\text{Delay difference} = \text{the outgoing time of a synchronization message} - \text{the incoming time of a synchronization message} \qquad (8)$$

$$\text{Communication delay time} = \text{the incoming time of a synchronization message} + \text{delay difference}/2 \qquad (9)$$

In addition, since the outgoing time of a synchronization message can be approximated by equation (10) and the incoming time of a synchronization message can be approximated by equation (11), the delay difference can be approximated by equation (12).

$$\text{The outgoing time of a synchronization message} \approx \text{total propagation time} + \text{outgoing queuing time} \qquad (10)$$

$$\text{The incoming time of a synchronization message} \approx \text{total propagation time} + \text{incoming queuing time} \qquad (11)$$

$$\text{Delay difference} = \text{outgoing queuing time} - \text{incoming queuing time} \qquad (12)$$

Here, the total propagation time is the communication time between the master apparatus 10 and the slave apparatus 20, excluding the queuing time at the network apparatus 30, and is common for both of the outgoing and incoming paths of synchronization messages. In addition, the outgoing queuing time indicates the total queuing time at the network apparatus 30 for the outgoing path of a synchronization message, and the incoming queuing time indicates the total queuing time at the network apparatus 30 for the incoming path of a synchronization message.

Here, as described above, by using, as a network apparatus 30 at a location where the amount of fluctuations in communication delay, i.e., a delay difference, is large, a special network apparatus capable of notifying about the amount of fluctuations in communication delay caused by the network apparatus, the slave apparatus 20 can grasp a portion of the outgoing queuing time occupied by the special network apparatus and a portion of the incoming queuing time occupied by the special network apparatus.

Hence, by using the outgoing queuing time and incoming queuing time at the special network apparatus, the slave apparatus 20 can estimate communication delay time with a high accuracy as shown in equation (13), enabling to increase the accuracy of time synchronization upon achieving time synchronization with the master apparatus 10.

$$\begin{aligned}\text{Communication delay time} &= \text{the incoming time of a} \\ &\quad \text{synchronization message} + \text{delay difference}/2 - \\ &\quad (\text{the outgoing queuing time at the special network apparatus} - \text{the incoming queuing time at} \\ &\quad \text{the special network apparatus})/2 \approx \text{the incoming} \\ &\quad \text{time of the synchronization message}\end{aligned} \quad (13)$$

Note that examples of the above-described special network apparatus include a switching apparatus having the IEEE1588-2008 Transparent clock function. By the Transparent clock function, the amount of fluctuations in communication delay caused by the network apparatus, i.e., the outgoing queuing time and incoming queuing time at the special network apparatus, can be notified to the slave apparatus 20.

For example, when the IEEE1588-2008 e2e mode is used, both a special network apparatus having the Transparent clock function and a general-purpose network apparatus that does not have the Transparent clock function can be adopted as a network apparatus 30, and thus, a network including both of these apparatuses can be constructed.

Note, however, that since adopting a general-purpose network apparatus is more advantageous in terms of costs, as in the first embodiment, by replacing a network apparatus 30 that is estimated to cause reduction of the accuracy of time synchronization with a special network apparatus having the Transparent clock function, and adopting general-purpose network apparatuses as other network apparatuses 30, the accuracy of time synchronization can be increased while costs are suppressed.

Second Embodiment

In a second embodiment, an example in which synchronization information, band information, traffic information, and path information are automatically inputted will be described. In the following, differences from the first embodiment are mainly described, and those components having the same functions as in the first embodiment are denoted by the same names and the same reference signs as those in the first embodiment and description thereof is omitted.

Figure 6:
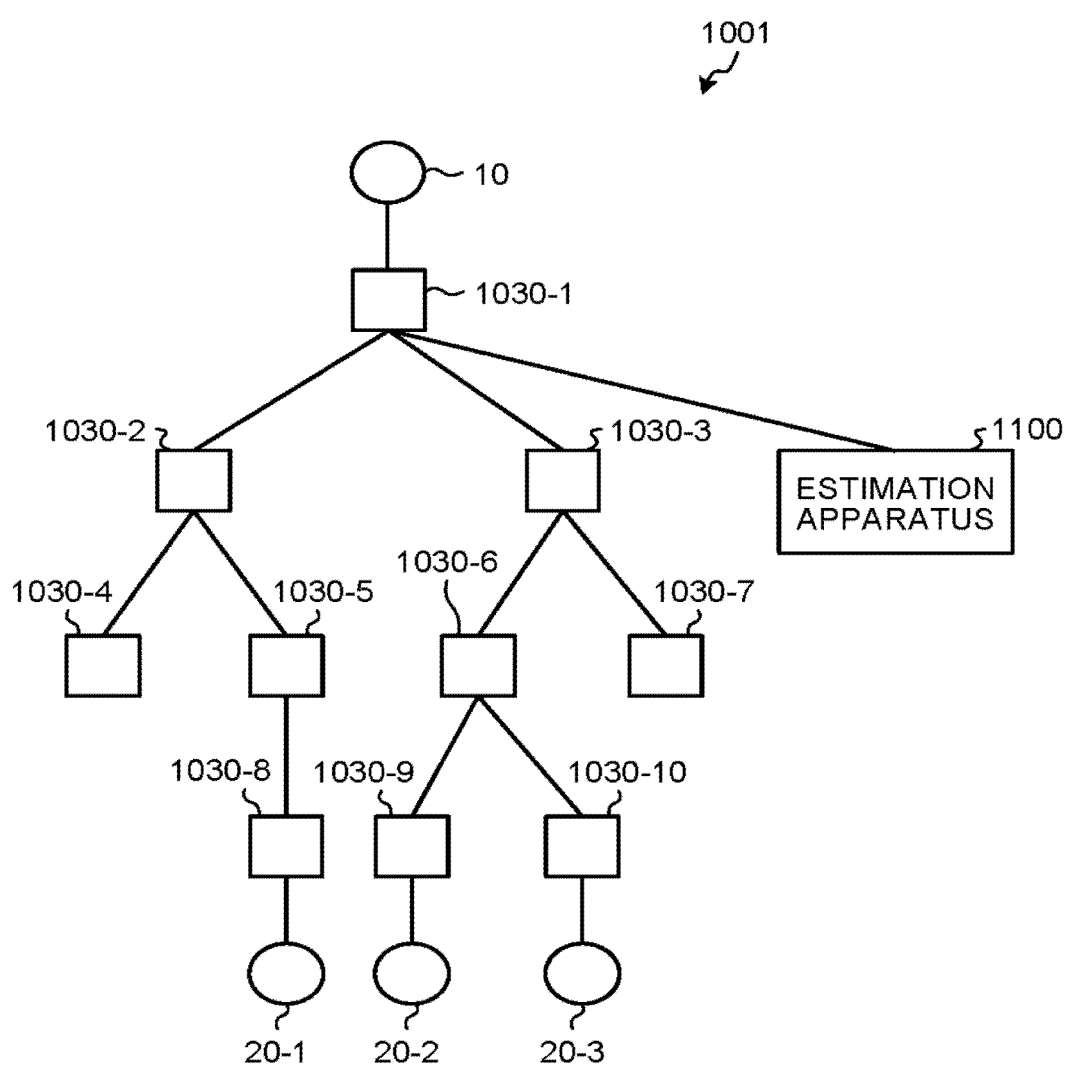
FIG. 6 is a diagram illustrating an example of a network configuration of a second embodiment.

FIG. 6 is a diagram illustrating an example of a network configuration 1001 of the second embodiment. As illustrated in FIG. 6, the network configuration 1001 differs from that of the first embodiment in an estimation apparatus 1100 being also connected thereto and in network apparatuses 1030-1 to 1030-10.

Figure 7:
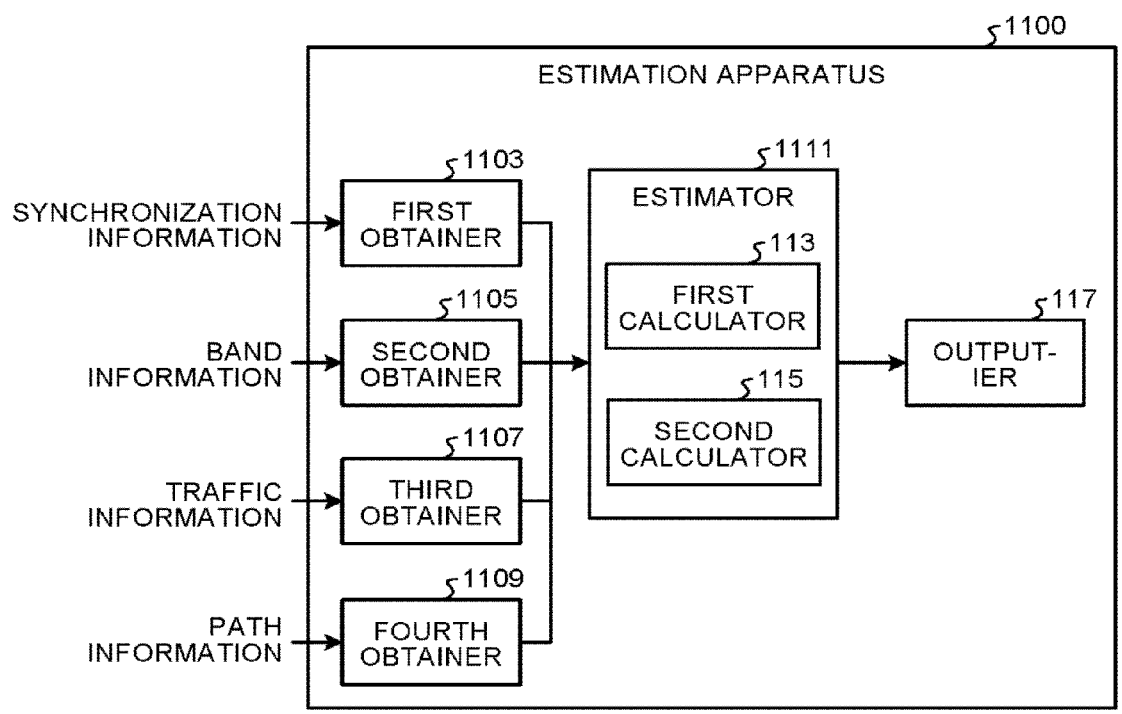
FIG. 7 is a diagram illustrating an example of a configuration of an estimation apparatus of the second embodiment.

FIG. 7 is a diagram illustrating an example of a configuration of the estimation apparatus 1100 of the second embodiment. As illustrated in FIG. 7, the estimation apparatus 1100 differs from that of the first embodiment in not including an inputter 101 and in a first obtainer 1103, a second obtainer 1105, a third obtainer 1107, a fourth obtainer 1109, and an estimator 1111.

The first obtainer 1103 obtains pieces of synchronization information of respective slave apparatuses 20-1 to 20-3 from the network apparatuses 1030-1 to 1030-10. The second obtainer 1105 obtains pieces of band information of a respective plurality of paths from the network apparatuses 1030-1 to 1030-10. The third obtainer 1107 obtains pieces of traffic information of the respective plurality of paths from the network apparatuses 1030-1 to 1030-10. The fourth obtainer 1109 obtains pieces of path information of the respective network apparatuses 1030-1 to 1030-10 from the network apparatuses 1030-1 to 1030-10. Note, however, that the fourth obtainer 1109 may obtain, as in the first embodiment, pieces of path information of the respective network apparatuses 1030-1 to 1030-10 from an input apparatus.

Each network apparatus 1030 periodically transmits synchronization information, band information, traffic information, and path information assigned thereto, to the estimation apparatus 1100 through other network apparatuses 1030. Note, however, that when there has been a change in the state of the network apparatus 1030, the network apparatus 1030 may transmit synchronization information, band information, traffic information, and path information assigned thereto, to the estimation apparatus 1100.

Note that the synchronization information transmitted from the network apparatus 1030 is information in which, for each message ID identifying a synchronization message, a path ID of a path through which the synchronization message passes among the paths of the network apparatus 1030, and cycle information indicating the transmission cycle of the synchronization message are associated, and is processed by the first obtainer 1103 of the estimation apparatus 1100 into synchronization information for each slave apparatus 20 which is described in the first embodiment.

When there has been a change in at least one of the pieces of synchronization information of the respective slave apparatuses 20-1 to 20-3, the pieces of band information of the respective plurality of paths, the pieces of traffic information of the respective plurality of paths, and the pieces of path information of the respective network apparatuses 1030-1 to 1030-10, the estimator 1111 estimates a predetermined network apparatus, based on the changed pieces of synchronization information of the respective slave apparatuses 20-1 to 20-3, pieces of band information of the respective plurality of paths, pieces of traffic information of the respective plurality of paths, and pieces of path information of the respective network apparatuses 1030-1 to 1030-10. Note that an estimation technique is the same as that of the first embodiment.

Figure 8:
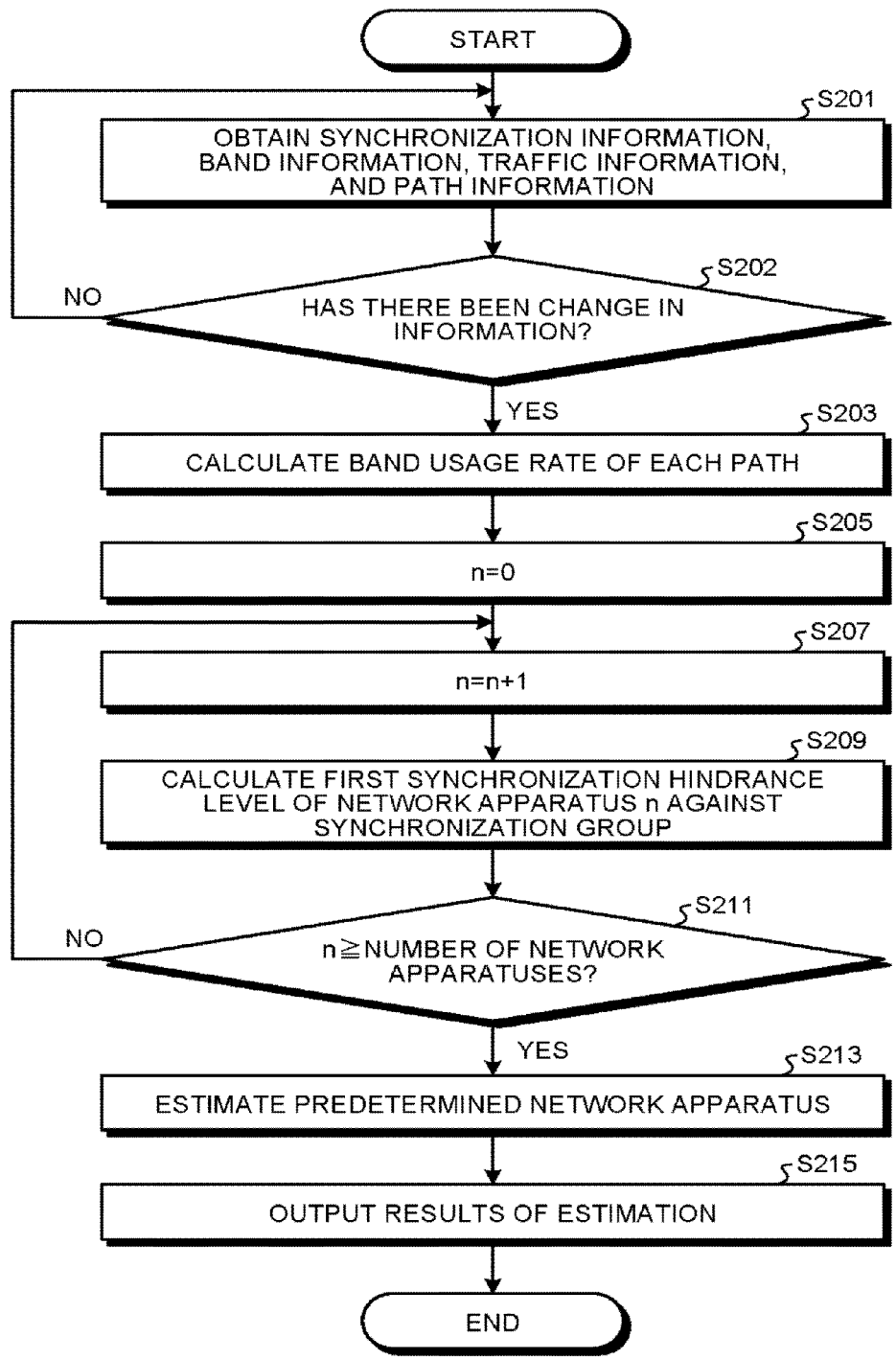
FIG. 8 is a flowchart illustrating an example of a process of the second embodiment.

FIG. 8 is a flowchart illustrating an example of the flow of a procedure for a process performed by the estimation apparatus 1100 of the second embodiment. Note that in the example illustrated in FIG. 8, too, the network IDs of the network apparatuses 1030-1 to 1030-10 are represented by 1 to 10, respectively, but are not limited thereto.

First, the first obtainer 1103 obtains pieces of synchronization information of the respective slave apparatuses 20-1 to 20-3 from the network apparatuses 1030-1 to 1030-10, the second obtainer 1105 obtains pieces of band information of the respective plurality of paths from the network apparatuses 1030-1 to 1030-10, the third obtainer 1107 obtains pieces of traffic information of the respective plurality of paths from the network apparatuses 1030-1 to 1030-10, and the fourth obtainer 1109 obtains pieces of path information of the respective network apparatuses 1030-1 to 1030-10 from the network apparatuses 1030-1 to 1030-10 (step S201).

Subsequently, the estimator 1111 checks whether there has been a change in at least one of the pieces of synchronization information of the respective slave apparatuses 20-1 to 20-3, the pieces of band information of the respective plurality of paths, the pieces of traffic information of the respective plurality of paths, and the pieces of path information of the respective network apparatuses 1030-1 to 1030-10 (step S202). If there has been no change in any of the information (No at step S202), processing returns to step S201, and if there has been a change in any of the information (Yes at step S202), processing proceeds to step S203.

The subsequent processes at steps S203 to S215 are the same as those at steps S103 to S115 of the flowchart illustrated in FIG. 5.

As described above, according to the second embodiment, since synchronization information, band information, traffic information, and path information are obtained from the network apparatuses 1030-1 to 1030-10, the input of synchronization information, band information, traffic information, and path information can be automated.

Particularly, according to the second embodiment, even when a change has occurred in at least one of synchronization information, band information, traffic information, and path information due to the introduction of a new terminal in the network configuration 1001, or the installation of a new application on an existing terminal (the existing terminal may include terminals other than a master apparatus 10 and the slave apparatuses 20, which are not illustrated in FIG. 6), or the replacement of a network apparatus 1030, a predetermined network apparatus can be automatically estimated under the changed conditions.

Note that the second embodiment may be combined with the first embodiment. For example, a technique of the first embodiment may be adopted at the start of operation, and a technique of the second embodiment may be adopted after the start of operation.

Hardware Configuration

Figure 9:
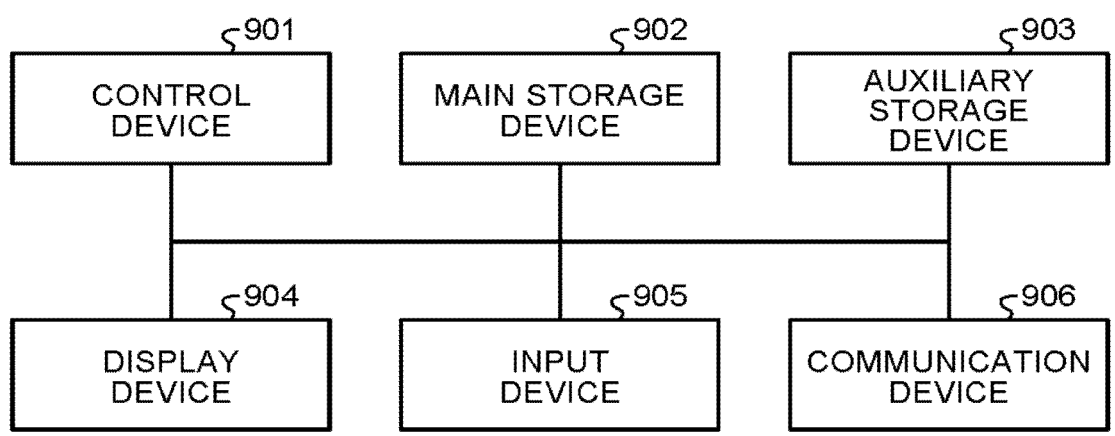
FIG. 9 is a diagram illustrating an example of a hardware configuration of the estimation apparatus of each embodiment.

FIG. 9 is a diagram illustrating an example of a hardware configuration of the estimation apparatus of each embodiment. As illustrated in FIG. 9, the estimation apparatus of each embodiment includes a control device 901 such as a CPU; a main storage device 902 such as a ROM (Read Only Memory) and a RAM (Random Access Memory); an auxiliary storage device 903 such as an HDD (Hard Disk Drive) or an SSD (Solid State Drive); a display device 904 such as a display; an input device 905 such as a keyboard and a mouse; and a communication apparatus 906 such as a communication interface, and has a hardware configuration using a normal computer.

A program executed by the estimation apparatus of each embodiment is provided as a file in installable format or executable format stored in a computer-readable storage medium such as a CD-ROM, a CD-R, a memory card, a DVD (Digital Versatile Disk), or a flexible disk (FD).

Alternatively, the program executed by the estimation apparatus of each embodiment may be provided by storing the program on a computer connected to a network such as the Internet, and downloading the program via the network. Alternatively, the program executed by the estimation apparatus of each embodiment may be provided or distributed via a network such as the Internet. Alternatively, the program executed by the estimation apparatus of each embodiment may be provided by pre-installing the program in the ROM, etc.

The program executed by the estimation apparatus of each embodiment has a module configuration for implementing the above-described units on the computer. For the actual hardware, by the CPU reading the program from the ROM, the HDD, or the like, into the RAM and executing the program, the above-described units are implemented on the computer. Note that when at least some of the above-described units are implemented by hardware such as an IC, the estimation apparatus of each embodiment may further include the IC, etc.

The present invention is not intended to be limited to the above-described embodiments as they are, and may be embodied at the implementation stage by modifying the components without departing from the spirit and scope thereof. In addition, various inventions may be formed by appropriate combinations of a plurality of components disclosed in the above-described embodiments. For example, some of all components described in the embodiments may be removed. Furthermore, components described in different embodiments may be combined together as appropriate.

For example, the order of performing the steps of the flowchart of each embodiment may be changed, or a plurality of steps may be performed simultaneously, or the steps may be performed in different orders every time the steps are performed, provided that the steps follow their nature.

As described above, according to the embodiments, a network apparatus (a relay node) that causes reduction of the accuracy of time synchronization can be estimated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An estimation apparatus comprising:
   circuitry configured to:
   obtain, for each of one or more slave nodes, a piece of synchronization information about a synchronization message for time synchronization to be communicated with a master node through at least one of a plurality of relay nodes in a network configuration including a plurality of nodes and a plurality of paths connecting the nodes, the plurality of nodes including the master node serving as a time synchronization source, the one or more slave nodes serving as time synchronization destinations, and the plurality of relay nodes;
   obtain, for each of the paths, a piece of band information about a bandwidth of the path;
   obtain, for each of the paths, a piece of traffic information about an amount of traffic in the path;
   obtain, for each of the relay nodes, a piece of path information about one or more paths on the relay node; and
   estimate a predetermined relay node that causes reduction of accuracy of time synchronization between the master node and the one or more slave nodes from among the plurality of relay nodes, based on one or more pieces of synchronization information, plurality of pieces of band information, plurality of pieces of traffic information, and plurality of pieces of path information.

2. The apparatus according to claim 1, wherein the circuitry is configured to:
   calculate, for each of the relay nodes, a first synchronization hindrance level of the relay node against the one or more slave nodes, based on the one or more pieces of synchronization information, the plurality of pieces of band information, the plurality of pieces of traffic information, and the plurality of pieces of path information, and estimate the predetermined relay node based on first synchronization hindrance levels of respective plurality of relay nodes.

3. The apparatus according to claim 2, wherein
each of the pieces of synchronization information includes
a piece of message identification information that identifies the synchronization message,
pieces of path identification information that respectively identify one or more paths forming a route for the synchronization message, and
a piece of cycle information that indicates a transmission cycle of the synchronization message,
each of the pieces of band information includes
a piece of path identification information of the path, and
a piece of bandwidth information that indicates a bandwidth of the path,
each of the pieces of traffic information includes
the piece of path identification information of the path, and
a piece of amount-of-traffic information that indicates a corresponding amount of traffic in a corresponding path,
each of the pieces of path information includes
a piece of relay node identification information that identifies the relay node, and
one or more of the pieces of path identification information of respective one or more paths on the relay node, and
the circuitry is configured to:
calculate a band usage rate of each of the paths, based on the plurality of pieces of band information and the plurality of pieces of traffic information;
calculate, for each set of the paths and the slave nodes, a second synchronization hindrance level of the path against the slave node, based on the band usage rate of each of the paths and the one or more pieces of synchronization information;
add up, for each of the slave nodes, second synchronization hindrance levels of respective plurality of paths to calculate a third synchronization hindrance level;
calculate, for each of the paths, a fourth synchronization hindrance level obtained by subtracting a maximum difference value among difference values between third synchronization hindrance levels and the second synchronization hindrance levels of the path for each of the slave nodes, from the third synchronization hindrance level with a maximum value among one or more of the third synchronization hindrance levels, the fourth synchronization hindrance level being a synchronization hindrance level of the path against the one or more slave nodes; and
add up, for each of the relay nodes, fourth synchronization hindrance levels of the respective one or more paths on the relay node based on the plurality of pieces of path information, to calculate the first synchronization hindrance level.

4. The apparatus according to claim 3, wherein the second synchronization hindrance level is a band usage rate of the path used by the synchronization message of the slave node.

5. The apparatus according to claim 2, wherein the circuitry is configured to classify, for each of the relay nodes, the relay node into a level determined according to a value of the first synchronization hindrance level of the relay node among a plurality of levels, and estimate one or more relay nodes that are classified into a predetermined level, as the predetermined relay node.

6. The apparatus according to claim 5, wherein the predetermined level is a level into which are classified one or more relay nodes whose values of the first synchronization hindrance levels are larger than those of one or more relay nodes classified into other levels among the plurality of levels.

7. The apparatus according to claim 2, wherein the circuitry is configured to determine, for each of the relay nodes, whether the first synchronization hindrance level is greater than or equal to a threshold value, and when the first synchronization hindrance level is greater than or equal to the threshold value, the circuitry is configured to add the relay node as the predetermined relay node.

8. The apparatus according to claim 2, wherein the circuitry is configured to rank the plurality of relay nodes based on the first synchronization hindrance levels of the respective plurality of relay nodes, and estimate the predetermined relay node based on the ranking.

9. The apparatus according to claim 1, wherein the circuitry is configured to output a result of the estimation.

10. The apparatus according to claim 9, wherein the circuitry is configured to output the result of the estimation such that the result of the estimation is reflected on a network configuration diagram illustrating the network configuration.

11. The apparatus according to claim 1, wherein the circuitry is configured to:
obtain the one or more pieces of synchronization information,
obtain in the plurality of pieces of band information,
obtain the plurality of pieces of traffic information, and
obtain the plurality of pieces of path information.

12. The apparatus according to claim 1, wherein the circuitry is configured to:
obtain the one or more pieces of synchronization information from the plurality of relay nodes,
obtain the plurality of pieces of band information from the plurality of relay nodes,
obtain the plurality of pieces of traffic information from the plurality of relay nodes, and
obtain the plurality of pieces of path information from the plurality of relay nodes.

13. An estimation system comprising an estimation apparatus and a plurality of relay nodes, wherein
the estimation apparatus includes circuitry configured to:
obtain, for each of one or more slave nodes, a piece of synchronization information about a synchronization message for time synchronization to be communicated with a master node through at least one of the plurality of relay nodes in a network configuration including a plurality of nodes and a plurality of paths connecting the nodes, the plurality of nodes including the master node serving as a time synchronization source, the one or more slave nodes serving as time synchronization destinations, and the plurality of relay nodes;
obtain, for each of the paths, a piece of band information about a bandwidth of the path;
obtain, for each of the paths, a piece of traffic information about an amount of traffic in the path;
obtain, for each of the relay nodes, a piece of path information about one or more paths on the relay node; and estimate a predetermined relay node that causes reduction of accuracy of time synchronization between the master node and the one or more slave nodes from among the plurality of relay nodes, based on one or more pieces of synchronization information, plurality of pieces of band information, plurality of pieces of traffic information, and plurality of pieces of path information, and each of the plurality of relay nodes transmits the synchronization information, the band information, the traffic information, and the path information to the estimation apparatus.

14. A computer program product comprising a non-transitory computer readable medium including programmed instructions, wherein the instructions, when executed by a computer, cause the computer to perform:

obtaining, for each of one or more slave nodes, a piece of synchronization information about a synchronization message for time synchronization to be communicated with a master node through at least one of a plurality of relay nodes in a network configuration including a plurality of nodes and a plurality of paths connecting the nodes, the plurality of nodes including the master node serving as a time synchronization source, the one or more slave nodes serving as time synchronization destinations, and the plurality of relay nodes;

obtaining, for each of the paths, a piece of band information about a bandwidth of the path;

obtaining, for each of the paths, a piece of traffic information about an amount of traffic in the path;

obtaining, for each of the relay nodes, a piece of path information about one or more paths on the relay node; and estimating a predetermined relay node that causes reduction of accuracy of time synchronization between the master node and the one or more slave nodes from among the plurality of relay nodes, based on one or more pieces of synchronization information, plurality of pieces of band information, plurality of pieces of traffic information, and plurality of pieces of path information.

* * * * *